United States Patent
L'Her et al.

(10) Patent No.: US 9,411,063 B2
(45) Date of Patent: Aug. 9, 2016

(54) METHOD AND DEVICE FOR MANAGING THE ACOUSTIC PERFORMANCES OF A NETWORK OF ACOUSTIC NODES ARRANGED ALONG TOWED ACOUSTIC LINEAR ANTENNAS

(71) Applicant: SERCEL, Carquefou (FR)

(72) Inventors: Christophe L'Her, Loperhetfrance (FR); Simon Vallez, Brest (FR)

(73) Assignee: SERCEL, Carquefou (FR)

( * ) Notice: Subject to any disclaimer, the term of this patent is extended or adjusted under 35 U.S.C. 154(b) by 709 days.

(21) Appl. No.: 13/720,413

(22) Filed: Dec. 19, 2012

(65) Prior Publication Data

US 2013/0155809 A1    Jun. 20, 2013

(30) Foreign Application Priority Data

Dec. 19, 2011    (EP) ..................................... 11306698

(51) Int. Cl.
*G01V 1/38*  (2006.01)
*G01S 11/14*  (2006.01)

(52) U.S. Cl.
CPC ............... *G01V 1/3835* (2013.01); *G01S 11/14* (2013.01); *G01V 1/38* (2013.01)

(58) Field of Classification Search
CPC ...... G01V 1/3835; G01V 1/38; G01V 1/3817
USPC .......................................................... 367/19
See application file for complete search history.

(56) References Cited

U.S. PATENT DOCUMENTS 6,691,038 B2 *  2/2004  Zajac .............................. 367/20
2010/0002537 A1  1/2010  Welker

FOREIGN PATENT DOCUMENTS

| GB | 2425597 A | 11/2006 |
| GB | 2443562 A | 5/2008 |
| GB | 2477148 A | 7/2011 |
| WO | 2005096018 A1 | 10/2005 |

OTHER PUBLICATIONS

European Search Report and Written Opinion dated May 30, 2012 for corresponding European Patent Application No. 11 30 6698 (4 pages).
European Search Report and Written Opinion dated May 24, 2012 for related European Patent Application No. 11 30 6697 (4 pages).

* cited by examiner

*Primary Examiner* — Ian J Lobo
(74) *Attorney, Agent, or Firm* — David D. Brush; Westman, Champlin & Koehler, P.A.

(57) ABSTRACT

A method and apparatus are provided for managing the acoustic performances of a network of acoustic nodes arranged along towed acoustic linear antennas. The network of acoustic nodes is adapted to determine inter-node distances allowing to locate the acoustic linear antennas. The method includes: obtaining a determined layout of the network of acoustic nodes; obtaining at least one marine environment property relating to an area of performance of a survey with the network of acoustic nodes; and quantifying the acoustic performances of the network of acoustic nodes, using a sound propagation model, the at least one marine environment property and the determined layout.

12 Claims, 7 Drawing Sheets

METHOD AND DEVICE FOR MANAGING THE ACOUSTIC PERFORMANCES OF A NETWORK OF ACOUSTIC NODES ARRANGED ALONG TOWED ACOUSTIC LINEAR ANTENNAS

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is the acquisition of geophysics data. It deals with the equipments required in order to study the sea bed and its sediment layers properties.

More specifically, the disclosure pertains to a technique for managing the acoustic performances of a network of acoustic nodes arranged along towed acoustic linear antennas.

The disclosure can be applied notably to the oil prospecting industry using seismic method (sea oil survey), but can be of interest for any other field which requires a system performing geophysics data acquisition in a marine environment.

TECHNOLOGICAL BACKGROUND

It is sought more particularly here below in this document to describe problems existing in the field of seismic data acquisition for oil prospecting industry. The disclosure of course is not limited to this particular field of application but is of interest for any technique that has to cope with closely related or similar issues and problems.

Figure 1:
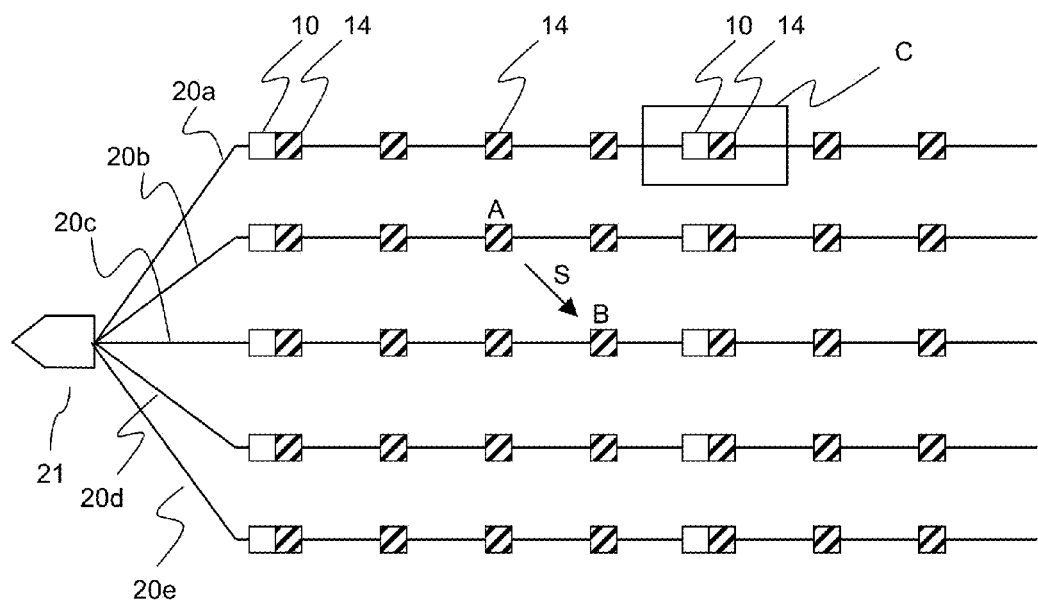

The operations of acquiring seismic data on site conventionally use networks of sensors (here below designated as "hydrophones" with regard to the acquisition of data in a marine environment). The hydrophones are distributed along cables in order to form linear acoustic antennas normally referred to as "streamers" or "seismic streamers". As shown in FIG. 1, the network of seismic streamers $20a$ to $20e$ is towed by a seismic vessel 21. The hydrophones are referenced 16 in FIG. 2, which illustrates in detail the block referenced C in FIG. 1 (i.e. a portion of the streamer referenced $20a$).

The seismic method is based on analysis of reflected seismic waves. Thus, to collect geophysical data in a marine environment, one or more submerged seismic sources are activated in order to propagate omni-directional seismic wave trains. The pressure wave generated by the seismic source passes through the column of water and insonifies the different layers of the sea bed. Part of the seismic waves (i.e. acoustic signals) reflected are then detected by the hydrophones distributed over the length of the seismic streamers. These acoustic signals are processed and retransmitted by telemetry from the seismic streamers to the operator station situated on the seismic vessel, where the processing of the raw data is carried out.

A well-known problem in this context is the localization of the seismic streamers. Indeed, it is important to precisely locate the streamers, in particular for:

monitoring the position of the hydrophones (distributed along the seismic streamers) in order to obtain a satisfactory precision of the image of the sea bed in the exploration zone;

detecting the movements of the streamers with respect to one another (the streamers are often subjected to various external natural constrains of variable magnitude, such as the wind, waves, currents); and monitoring the navigation of streamers, in particular in a situation of bypassing an obstacle (such as an oil barge).

In practice, it is aimed to carry out an analyze of sea bed with a minimum number of passage of the vessel in the concerned area. For that purpose, the number of streamers implemented in the acoustic network is substantially raised. The aforesaid problem of localization of the streamers is thus particularly noticeably, especially in view of the length of the streamers, which may vary between 6 and 15 kilometers, for example.

Figure 2:
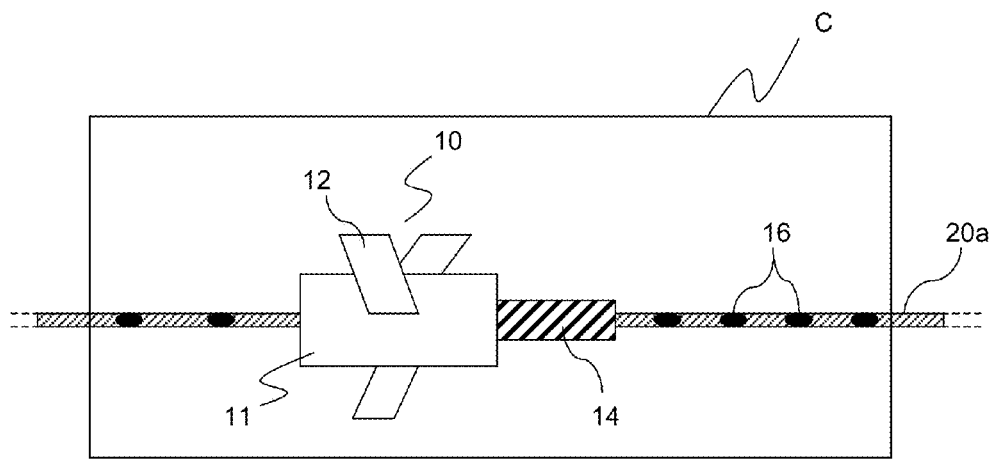

Control of the positions of streamers lies in the implementation of navigation control devices, commonly referred to as "birds" (white squares referenced 10 in FIG. 1). They are installed at regular intervals (every 300 meters for example) along the seismic streamers. The function of those birds is to guide the streamers between themselves. In other words, the birds are used to control the depth as well as the lateral position of the streamers. For this purpose, and as illustrated in FIG. 2, each bird 10 comprises a body 11 equipped with motorized pivoting wings 12 (or more generally means of mechanical moving) making it possible to modify the position of the streamers laterally between them (this is referred to a horizontal driving) and drive the streamers in immersion (this is referred to a vertical driving).

To carry out the localization of the seismic streamers (allowing a precise horizontal driving of the streamers by the birds), acoustic nodes are distributed along the streamers. These acoustic nodes are represented by hatched squares, referenced 14, in FIGS. 1 and 2. As shown in FIG. 1, some acoustic nodes 14 of the network are associated with a bird 10 (case of FIG. 2), and other are not.

The acoustic nodes 14 use underwater acoustic communication means, hereafter referred to as electro-acoustic transducers, allowing to estimate the distances between acoustic nodes (named here below "inter-node distances"). More specifically, these transducers are transmitters and receivers of acoustic signals, which can be used to estimate an inter-node distance separating two acoustic nodes (acting as sender node and receiver node respectively) situated on two different streamers (which may be adjacent or not) as a function of an acoustic signal propagation duration measured between these two nodes (i.e. a travel time of the acoustic signal from the sender node to the receiver node). From the acoustic network, this thereby forms a mesh of inter-node distances allowing to know precise horizontal positioning of all the streamers.

Transducer here is understood to mean either a single electro-acoustic device consisting of a transceiver (emitter/receiver) of acoustic signals, or a combination of a sender device (e.g. a pinger) and a receiver device (e.g a pressure particle sensor (hydrophone) or a motion particle sensor (accelerometer, geophone . . . )).

Usually, each acoustic node comprises an electro-acoustic transducer enabling it to behave alternately as a sender node and a receiver node (for the transmission and the reception, respectively, of acoustic signals). In an alternative embodiment, a first set of nodes act only as sender nodes and a second set of nodes act only as receiver nodes. A third set of nodes (each acting alternately as a sender node and a receiver node) can also be used in combination with the first and second sets of nodes.

The inter-node distance $d_{AB}$ between two nodes A and B can be typically estimated on the basis of the following formula: $d_{AB}=c.t_{AB}$, with:

node A acting as a sender node which transmits an acoustic signal S to node B acting as a receiver node (see example in FIG. 1, with acoustic signal S shown as an arrow between nodes referenced A and B);

$t_{AB}$, the propagation duration (travel time) elapsed between the emission instant and reception instant of the acoustic signal transmitted from the sender node A to the receiver node B (assuming that the receiver node and the sender node are synchronized); and c, a "measured" or "estimated" value of sound speed (also referred to as sound velocity) of the acoustic signal.

Computation of an inter-node distance can be carried out, either by the navigation system (for positioning the set of hydrophones), or the node manager system (for providing useful information to the birds for horizontal driving), or the acoustic nodes themselves (in case they are equipped with electronics intended for this computation). The acoustic nodes are further synchronized by the node manager system through a wire communication bus placed within the streamers.

In the known techniques of the prior art, the network of acoustic nodes is defined by a predetermined layout (also referred to as nodes network geometry) which is itself defined, for example, by predetermined horizontal distances between the acoustic nodes and a predetermined immersion depth of each acoustic node (i.e. the predetermined layout is a predetermined mesh of acoustic nodes each having a predetermined location along one of the streamers and each having a predetermined immersion depth). The expected acoustic performances of the network of acoustic nodes are not considered and the global strategy (in terms of emitted signal levels, signal processing tools, nodes excitation strategy in the network . . . ) does not take into account the environment properties (which influence the acoustic channel propagation properties).

A major drawback of these known techniques is that the environment properties (also referred to as environmental conditions) are not taken into account in order to quantify the acoustic performances of the network (e.g. to predict a decrease in the real acoustic performances of the network, compared with he expected acoustic performances), neither before a seismic survey (i.e. when preparing it) nor during a seismic survey. A fortiori, nothing is proposed in terms of modification of the layout (before the survey) nor any adjustment of the node network parameters (during the survey), if the expected acoustic performances are not obtained (the performances are not enslaved to the channel properties).

Unfortunately, in practice, the expected acoustic performances are hardly obtained because the environmental conditions (sound speed profile, bathymetry and nature of the sub-bottom layers) in the area where the seismic survey is performed can modify the acoustic paths of sound.

In particular, in the known techniques, the sound speed c is supposed to be constant in the vertical plane. However, in practice this will not be the case. The sound speed in the ocean widely depends on the temperature, pressure and salinity of water (especially) and thus is almost always depending on depth (z) considered; in that case we talk about sound speed profile (SSP). Depending on the shape of the sound speed profile (SSP) in the area where the seismic survey is performed, the sound will not necessary follow a straight line (as supposed in the inter-node distance estimation formula described above) but a curved ray path due to the refraction phenomena (according to Snell Descartes laws). Indeed, in a non uniform medium the sound rays can be bended (refracted) due to the change of the sound speed and more precisely to its gradient. The wavefronts of the sound are refracted toward the layer where the sound speed is lower, the refraction will be more pronounced if the change in the sound speed is rapid.

FIGS. 3 to 7 illustrate the influence of a sound speed gradient in the channel. For each of these figures, the left part presents a sound speed profile and the right part presents the corresponding ray paths, obtained with a ray path tracing method for a 10° aperture launch (FIGS. 3 to 6) or a 6° aperture launch (FIG. 7), and a 300 m-distance. Those figures enable to compare the ray paths followed by the sound in three mediums. As can be seen in the left part of these figures, the first medium (FIG. 5) is a 50 m depth water column with a constant sound speed, the second medium (FIGS. 3 and 4) is a medium constituted with a 50 m water column and a 25 m depth minimum of sound speed with a constant gradient, and the third medium (FIGS. 6 and 7) is a medium constituted with a 50 m water column and a 10 m-depth mixed layer (constant sound speed) with a 25 m depth minimum of sound speed with a constant gradient.

Figure 3:
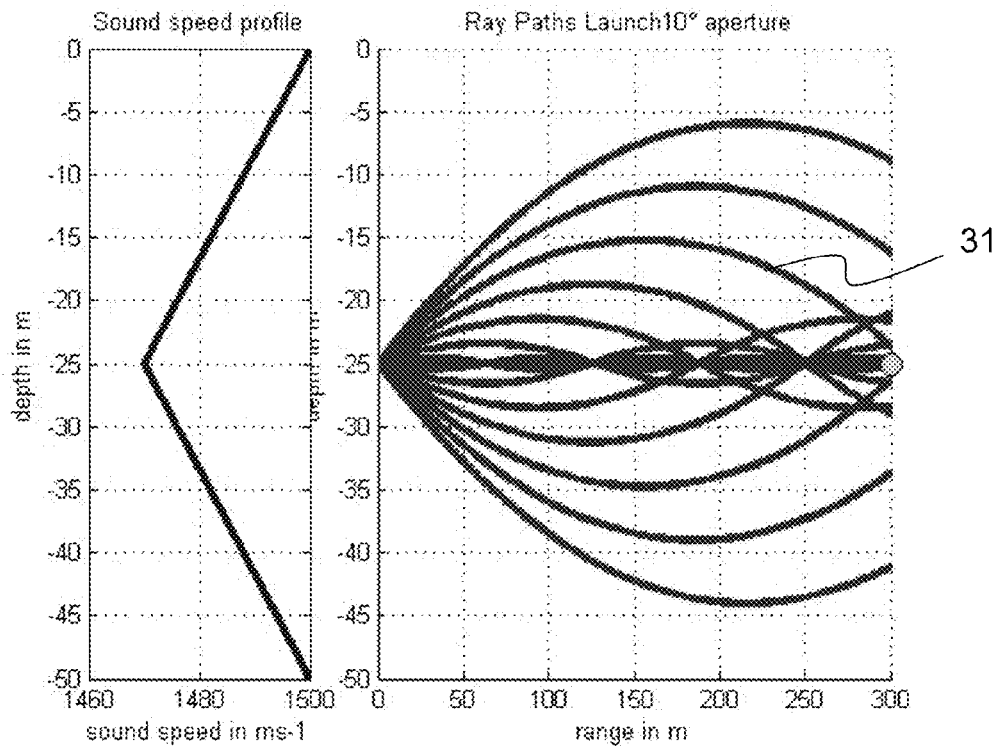
Figure 4:
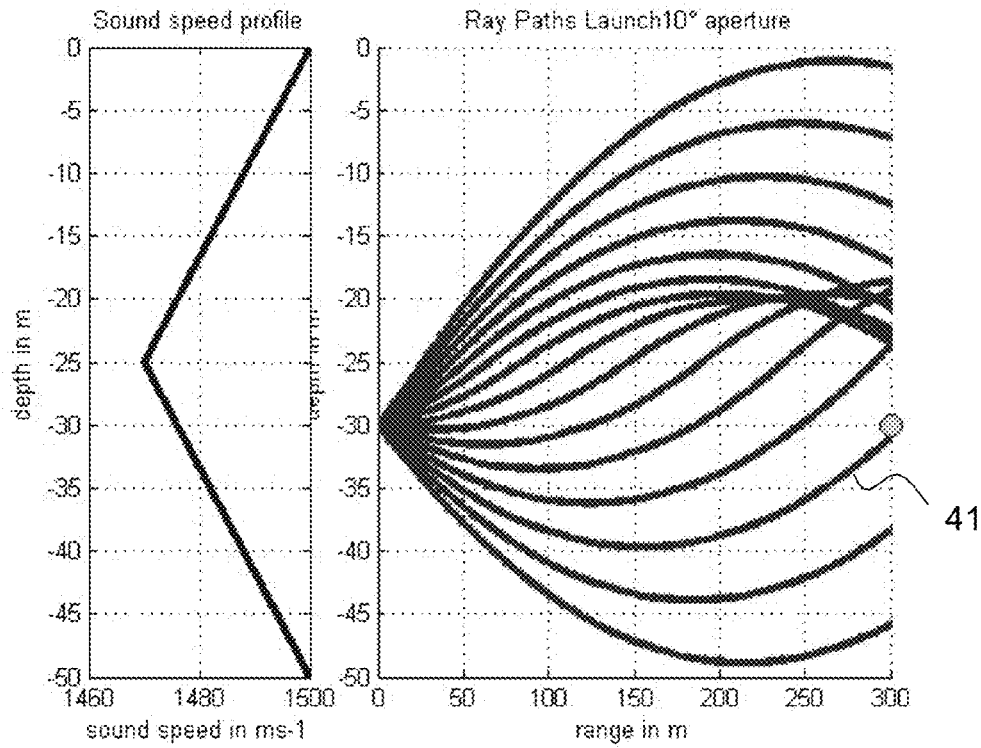
Figure 5:
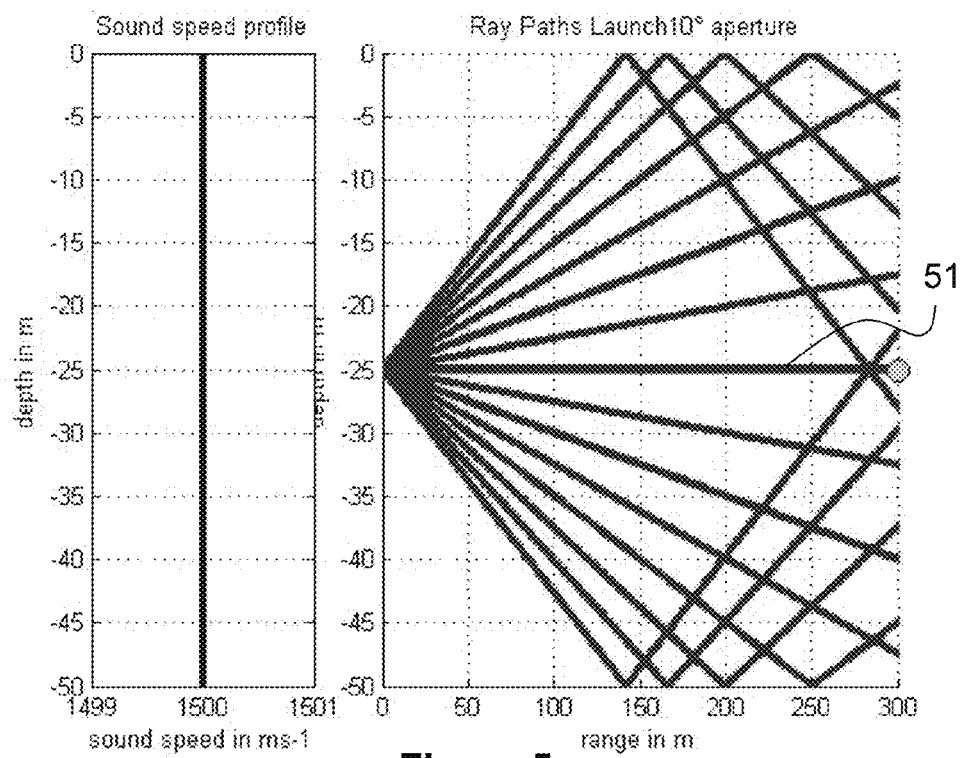
Figure 6:
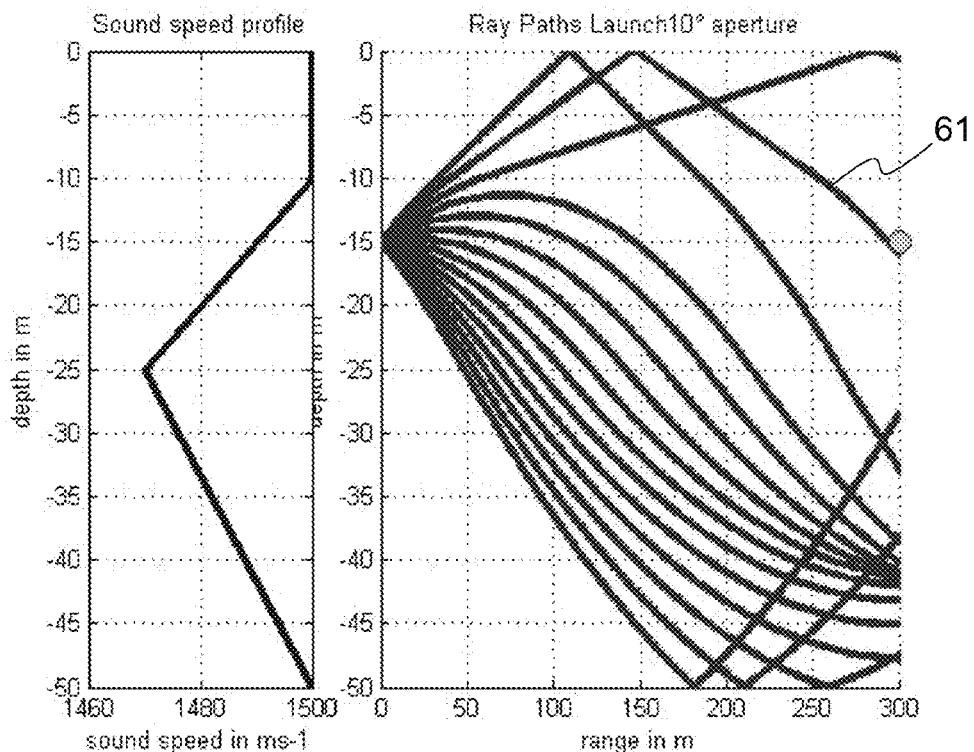
Figure 7:
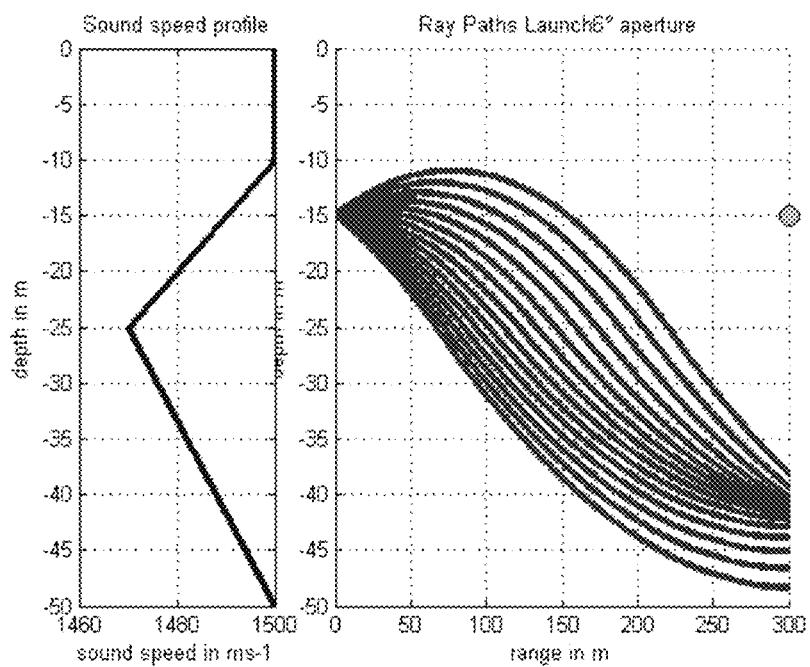

As can be seen in the right part of these figures, the depth of the source (sender node) is 25 m in FIGS. 3 and 5, 30 m in FIG. 4 and 15 m in FIGS. 6 and 7.

The sound will follow straight paths in the first medium (FIG. 5), and strongly curved paths in the second and third media, depending on depth (FIGS. 3, 4, 6 and 7). We can note that in FIGS. 3 and 4, if the receiver node has a 30 m depth, there is a direct curved path between the sender node and the receiver node. On the contrary, in FIG. 6, if the receiver node has a 15 m depth, there is no direct path, but only a surface reflected path, between the sender node and the receiver node. And in FIG. 7, if the receiver node has a 15 m depth, there is no path at all between the sender node and the receiver node (assuming a 6° aperture).

Figure 8:
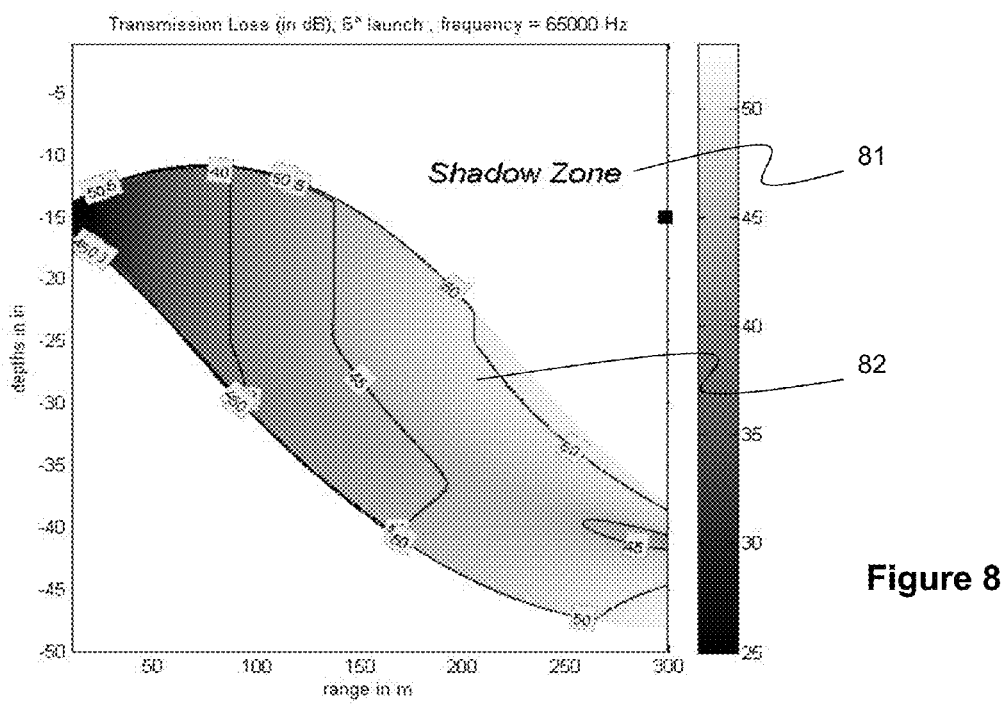

FIG. 8 presents an example of transmission loss with the channel of FIG. 7. More precisely, the right side of FIG. 8 shows the distinctive codes (used on the left side of FIG. 8) associated with different values of transmission loss (in dB). The left side of FIG. 8 gives a computed value of transmission loss for each point, corresponding to a receiving location defined by a depth and a horizontal distance from the sender node. The left side of FIG. 8 shows two mains zones: a shadow zone 81, comprising points for each which there is no path between the sender node and this point (white zone of the figure), and a reception zone, comprising points for each which there is a path between the sender node and this point (gray scale part of the figure).

As explained above, the expected acoustic performances of the network of acoustic nodes are hardly obtained because the acoustic paths of sound are modified (refracted) as a function of the sound speed profile (which is one of the environment properties of the area where the seismic survey is performed). Indeed, the real acoustic performances can be different from the expected ones because between a sender node and a receiver node (located according to the predetermined layout) there is no direct straight path but direct curved paths (see FIGS. 3 and 4), reflected paths (see FIG. 6), or no path at all (see FIG. 7). Moreover, if the two nodes A and B considered are not at the same depth, the ray path from node A to node B and the one from node B to node A can be different and so the travel time can be different depending on the way of the signal.

When the path is curved, the distance along the path will be more important than in the straight line case. Thus the inter-node distance obtained with the classical formula ($d_{AB}=c.t_{AB}$), assuming a constant sound speed profile, will be over estimated which is a synonym of a lack of localization precision or a bias in the localization result (the localization of the streamers being based on the inter-node distances obtained with a plurality of couples of acoustic nodes).

When the path is reflected, if it is not identified as such, the distance between nodes will be potentially significantly over-estimated. Moreover, the reflected paths (especially in the case of bottom reflection) are often substantially attenuated, thereby reducing the signal/noise ratio at the receiver node and can impact the correlation between received signal and transmitted signal.

In warm ocean region, a typical sound speed profile has three parts corresponding to the three layers of the water column: the surface layer (mixed layer), the main thermocline and the deep isothermal layer. The mixed layer can be few meters thick, but can also extend to several dozens of meter (depending on seasons, sun, sea state, currents . . . ). The mixed layer can disappear in colder oceans. The sound speed is almost constant for the mixed layer, but not for the main thermocline and the deep isothermal layer. The tendency in the field of seismic data acquisition is to increase the depth of the streamer which can place the streamer (and the acoustic nodes) under the mixed layer (and therefore in the main thermocline) and thus increase the refraction phenomena.

The real acoustic performances of the network of acoustic nodes are not always the expected ones also because, depending on bathymetry, the ocean bottom reflected paths can reach the receiver node with more or less important time differences and the magnitude of the bottom reflected path will directly depends on the kind (sand, mud, rocks . . . ) and on sediment layer thickness in the different sub-bottom layers of the area where the seismic survey is performed.

Moreover, in very shallow water conditions, the bottom reflected echoes (paths) can be very powerful (depending on sub-bottom properties) and have small time difference with the direct path. This can thwart the detection and the date of the direct path.

SUMMARY

An embodiment of the present disclosure relates to a method for managing the acoustic performances of a network of acoustic nodes arranged along towed acoustic linear antennas, the network of acoustic nodes being adapted to determine inter-node distances allowing to locate the acoustic linear antennas, characterized in that the method comprises steps of:
  obtaining a determined layout of the network of acoustic nodes;
  obtaining at least one marine environment property relating to an area of performance of a survey with the network of acoustic nodes;
  quantifying the acoustic performances of the network of acoustic nodes, using a sound propagation model, the at least one marine environment property and the determined layout.

This particular embodiment relies on a wholly novel and inventive because it takes into account the environment properties (of the area of performance of the survey) to manage the acoustic performances of the network of acoustic nodes.

According to a particular feature, the determined layout is defined at least by determined horizontal distances between the acoustic nodes and a determined immersion depth of each acoustic node.

The layout can also be defined by supplementary parameters.

According to a particular feature, the step of quantifying the acoustic performances comprises, for at least one given couple of nodes comprising a sender node and a receiver node, steps of:
  estimating the propagation properties of an acoustic signal through an underwater acoustic channel between the sender node and the receiver node of the given couple of nodes, using said sound propagation model and knowing:
    the immersion depths of the sender node and the receiver node,
    a horizontal distance between the sender node and the receiver node, and
    the at least one marine environment property, comprising at least an estimate of the sound speed profile of the underwater acoustic channel;
  associating an acoustic performance value to the given couple of nodes, as a function of at least one the result of the step of estimating the propagation properties.

As detailed below, an acoustic performance value is for example "poor" or "admissible", as the value is lower or higher or equal than a threshold (predetermined sensitivity).

The greater the number of couples of nodes whose performance is quantified, the better the quantifying of the acoustic performances of the network is.

According to a particular feature, the at least one result of the step of estimating the propagation properties belongs to the group comprising:
  a first piece of information relating to a kind of at least one path existing between the sender node and the receiver node of the given couple of nodes;
  a second piece of information relating to a magnitude of at least one path existing between the sender node and the receiver node of the given couple of nodes; and
  a third piece of information relating to a multipath correlation distortion rate.

It is possible to use either one or all of these pieces of information, and even other.

According to a particular feature, the at least one marine environment property belongs to the group comprising:
  sound speed profiles, depending on depth;
  bathymetric characteristics;
  sub-bottom properties.

It is possible to use either one or all of these environment properties, and even other.

According to a particular feature, the step of obtaining at least one marine environment property is carried out using at least one method belonging to the group comprising:
  methods of consulting at least one database;
  methods of direct measuring, using a measurement device and/or an acoustic method; and
  methods of indirect measuring, using an inversion process.

According to a particular feature, the method comprises a step of improving the acoustic performances of the network of acoustic nodes, as a function of at least one result of the step of quantifying.

Thus, after quantifying, it is possible to act in order to improve the acoustic performances of the network of acoustic nodes.

According to a particular feature, the step of improving the acoustic performances takes into account the acoustic performance value associated to the at least one given couple of nodes.

In a first implementation, the step of improving the acoustic performances of the network of acoustic nodes comprises a step of modifying the determined layout, as a function of at least one result of the step of quantifying.

We assume in this first implementation that the layout can be modified.

According to a particular feature of the first implementation, the method is executed before the survey.

Indeed, it is easier to modify the layout before the survey.

In a second implementation, the step of improving the acoustic performances of the network of acoustic nodes comprises a step of adjusting at least one parameter of the network of acoustic nodes, without modifying the determined layout, as a function of the result of the step of quantifying.

This second implementation is particularly suitable when the layout can not be modified. However, it is possible to combine the first and second implementations, i.e. to modify the layout and adjust one or several other parameters of the network of acoustic nodes.

According to a particular feature of the second implementation, the at least one parameter of the network of acoustic nodes belongs to the group comprising:
- emitted levels of acoustic signals emitted by the acoustic nodes;
- properties of acoustic signals emitted by the acoustic nodes;
- time and/or frequency sharing methods implemented by the acoustic nodes, having an impact on acoustic cycle durations;
- signal processing methods implemented by the acoustic nodes to process received acoustic signals.

It is possible to use either one, several or all of these environment properties, and even other.

According to a particular feature of the second implementation, the method is executed during the survey.

Indeed, it is difficult to modify the layout during the survey.

Another embodiment pertains to a computer program product comprising program code instructions for implementing the above-mentioned method (in any of its different embodiments) when said program is executed on a computer or a processor.

Another embodiment pertains to a non-transitory computer-readable carrier medium, storing a program which, when executed by a computer or a processor, causes the computer or the processor to carry out the above-mentioned method (in any of its different embodiments).

Another embodiment proposes a device for managing the acoustic performances of a network of acoustic nodes arranged along towed acoustic linear antennas, the network of acoustic nodes being adapted to determine inter-node distances allowing to locate the acoustic linear antennas. The device comprises:
- means for obtaining a determined layout of the network of acoustic nodes;
- means for obtaining at least one marine environment property relating to an area of performance of a survey with the network of acoustic nodes;
- means for quantifying the acoustic performances of the network of acoustic nodes, using a sound propagation model, the at least one marine environment property and the determined layout.

LIST OF FIGURES

Figure 9:
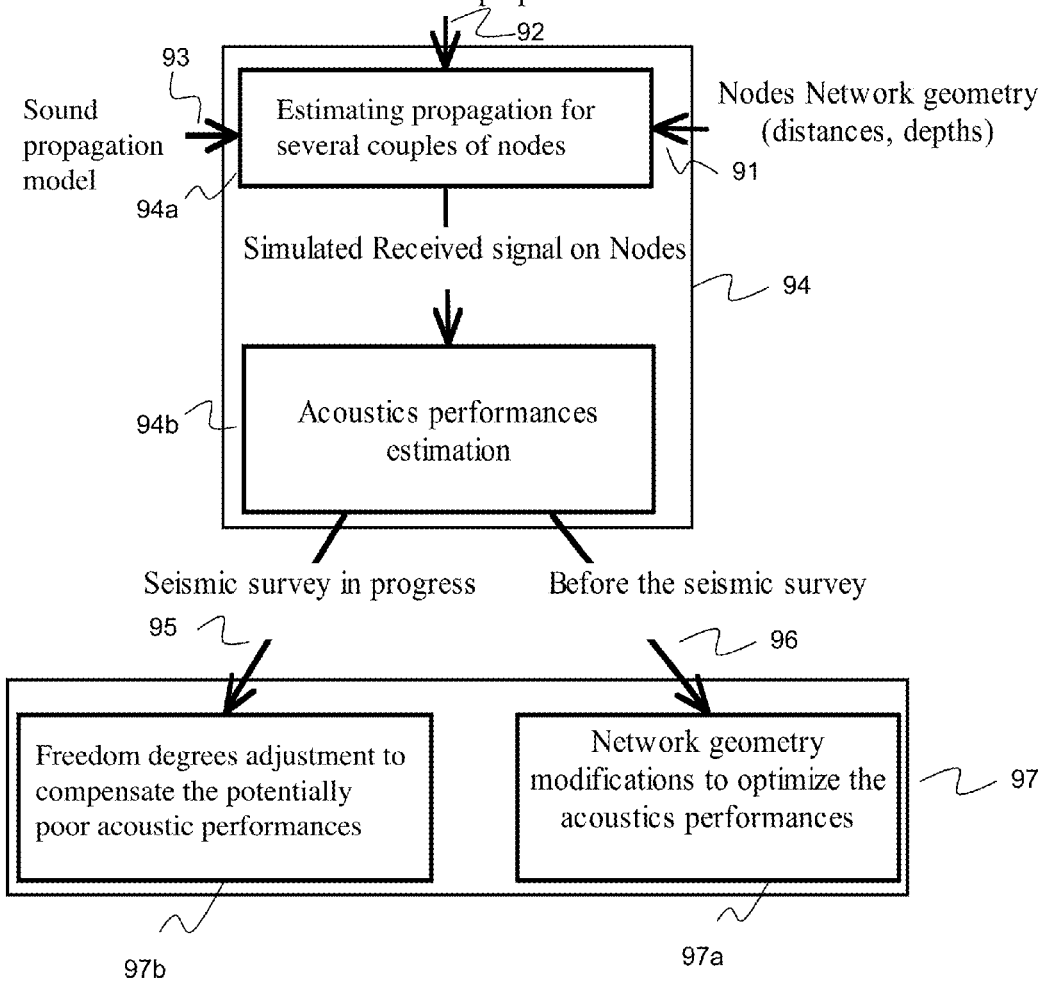
Figure 10:
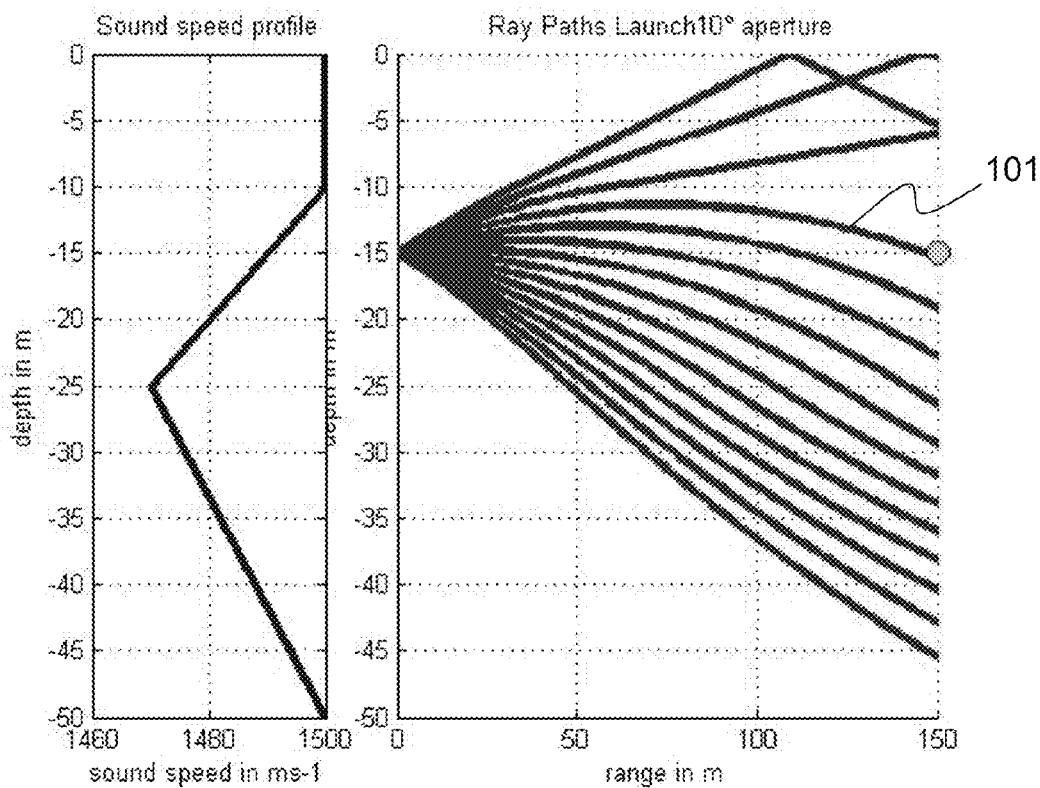
Figure 13:
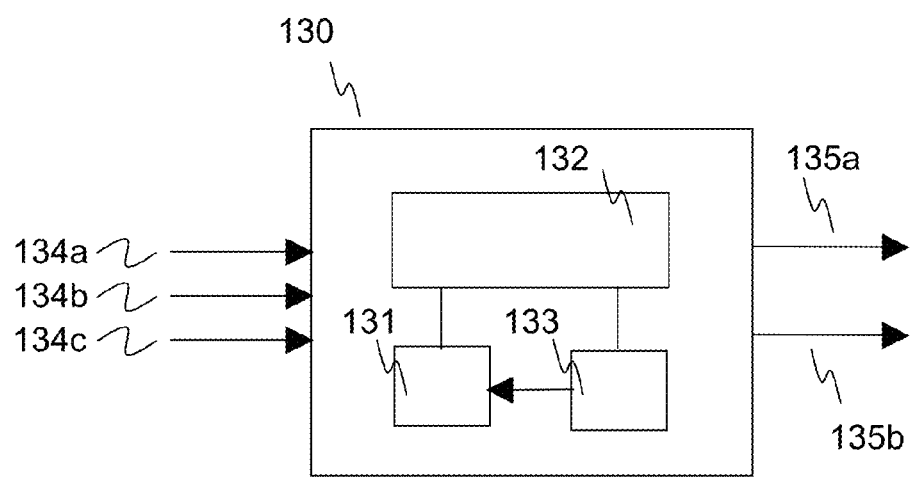
Figure 11:
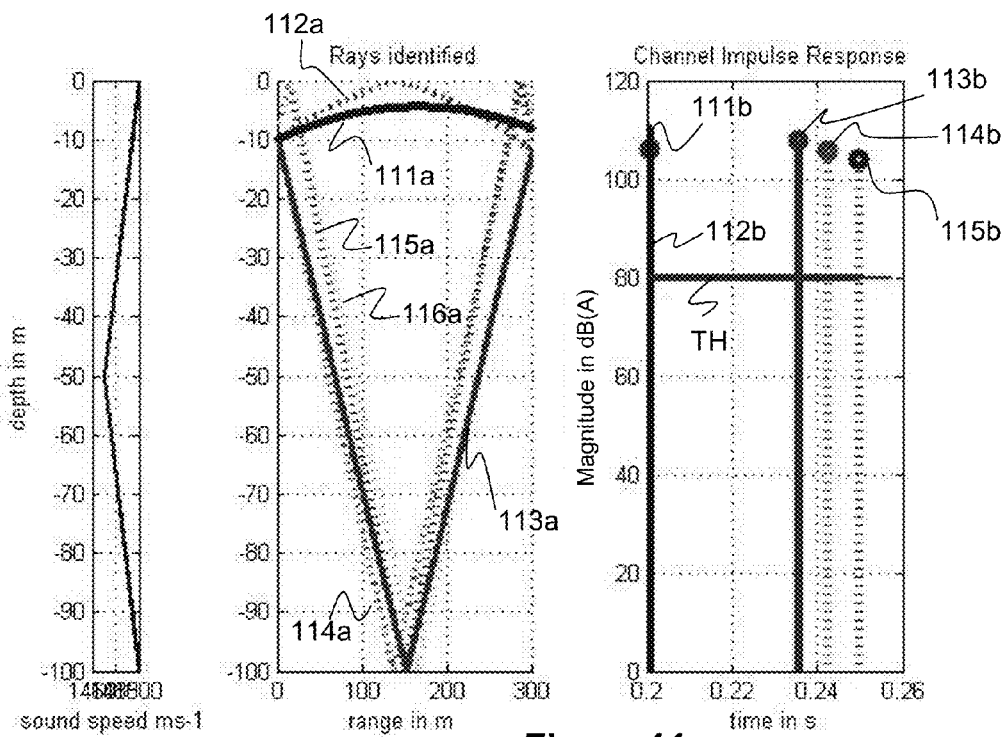
Figure 12:
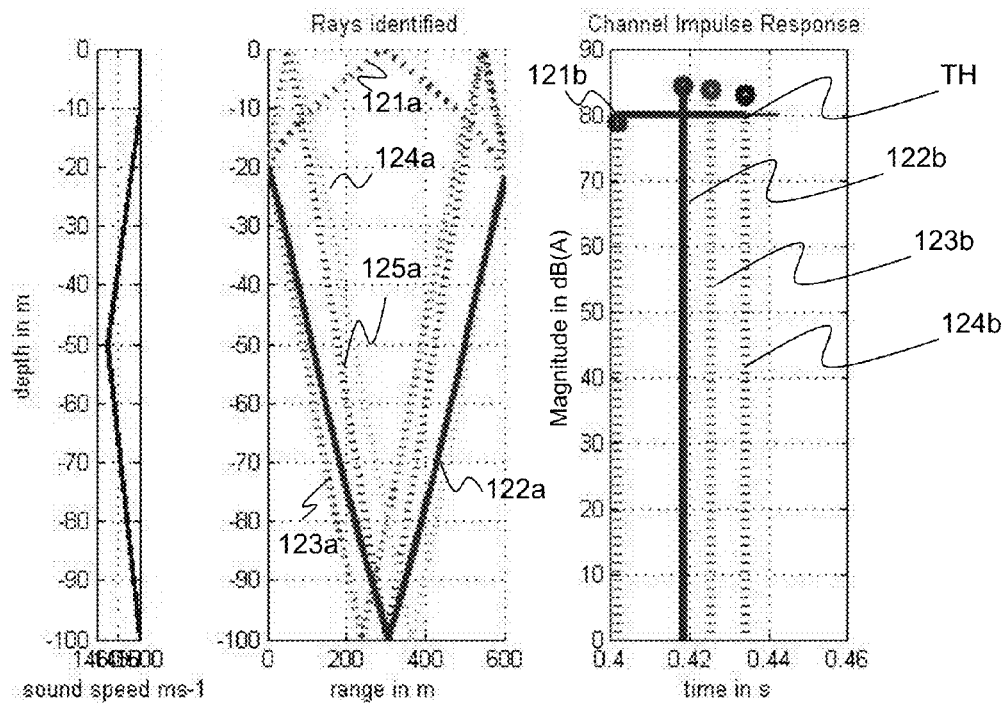

Other features and advantages of embodiments shall appear from the following description, given by way of an indicative and non-exhaustive examples and from the appended drawings, of which:

FIG. 1, already described with reference to the prior art, presents an example of network of seismic streamers towed by a seismic vessel;

FIG. 2, already described with reference to the prior art, illustrates in detail the block referenced C in FIG. 1 (i.e. a portion of the streamer);

FIGS. 3 to 7, already described with reference to the prior art, each present a sound speed profile (left part of the figure) and corresponding ray paths (right part of the figure);

FIG. 8, already described with reference to the prior art, presents an example of transmission loss with the channel of FIG. 7;

FIG. 9 is a flowchart of a particular embodiment of the method according to the present disclosure;

FIG. 10 presents another example of sound speed profile (left part of the figure) and corresponding ray paths (right part of the figure), which differs from FIG. 6 only in that the 300 m-distance has been changed to a 150 m-distance;

FIGS. 11 and 12 each present a sound speed profile (left part of the figure), corresponding ray paths (middle part of the figure) and corresponding channel impulse response (right part of the figure);

FIG. 13 shows the simplified structure of a management device according to a particular embodiment of the disclosure.

DETAILED DESCRIPTION

FIGS. 1 to 8 have been already described above in relation with the prior art.

In the following description, it is considered as an example the management of the acoustic performances of the network of acoustic nodes 14 shown in FIG. 1 and arranged along seismic streamers 20a to 20e.

Referring now to FIG. 9, we present a particular embodiment of the method for managing according to an example of the present disclosure.

In step 91, we obtain the layout of the nodes network (also referred to as nodes network geometry), defined, for example, by horizontal distances between the acoustic nodes and a predetermined immersion depth of each acoustic node.

In step 92, we obtain marine environment properties (sound speed profiles, bathymetric characteristics, sub-bottom properties . . . ) relating to an area of performance of a survey with the network of acoustic nodes.

As detailed below, the method for managing according can be implemented before (i.e. in preparation of) the seismic survey and/or during the seismic survey.

In the first case (i.e. before the survey), there are many ways to obtain the environment properties:
- for the sound speed profile (SSP): prior knowledge on the environment (worldwide databases), direct measurement (using a system such as a bathythermograph (XBT (expendable bathythermograph), CTD (Conductivity Temperature Depth) device, etc. . . . ) or using an acoustic method), or indirect measurement (using an inversion method);
- for the bathymetry (bathymetric characteristics): side-scan sonar, single beam echo sounder, multi-beam echo sounder;
- for the sub-bottom properties: sediment sounder or seismic data acquisition system.

In the second case (i.e. during the survey), there are also many ways to obtain the environment properties:

for the sound speed profile (SSP): direct punctual measurement (using a system such as a bathythermograph (XBT (expendable bathythermograph), CTD (Conductivity Temperature Depth) device, etc. . . . ) or direct continuous measurement (with an important spatial and temporal rate) (using a sound speed profiler which is moving in the water column continuously, performing sinusoidal movement or free fall (e.g Moving Vessel Profiler (MVP));

for the bathymetry (bathymetric characteristics): continuous measurement of water depth with echo sounder, side-scan sonar, multi-beam echo sounders etc;

for the sub-bottom properties: continuous characterization with sub-bottom profiler, sediment sounder or seismic data acquisition system.

In step 93, we obtain a sound propagation model, e.g. ray theory model (the corresponding method is called "ray path tracing method"). Other sound propagation models can be used to assess the received signal at the receiver node, such as parabolic equation, wavenumber integration or normal modes (the choice depends on frequency considered, water depth, range dependency . . . ).

In step 94, we quantify the acoustic performances of the nodes network, using the output of steps 91, 92 and 93. More precisely, in the particular embodiment of FIG. 9, the step 94 comprises two step 94a and 94b.

In step 94a, for each of a plurality of couples of nodes (sender node and receiver node), we estimate the propagation properties of an acoustic signal through an underwater acoustic channel between the sender node and the receiver node. Step 94a is carried out using the sound propagation model (obtained in step 93), the environment properties (obtained in step 92) and the determined layout (obtained in step 91). The result of step 94a is a simulated received signal for each receiver node considered. This simulated received signal is for example defined by:

a first piece of information relating to a kind of at least one path existing between the sender node and the receiver node. The different kinds of the paths are for example: direct straight line path (referenced 51 in FIG. 5 described above), reflected path (referenced 51 in FIG. 6 described above), refracted path (referenced 31 in FIG. 3 and 41 in FIG. 4 described above), no path (see FIG. 7 described above) . . . ;

a second piece of information relating to a magnitude of at least one path existing between the sender node and the receiver node. The magnitude of a path is for example given by the transmission loss computed for this path (see FIG. 8 described above) or by the channel impulse response computed for this path (see FIGS. 11 and 12 described below); and a third piece of information relating to a multipath correlation distortion rate (deductible from the channel impulse response).

In step 94b, we estimate the acoustic performances of the nodes network, and more precisely we estimate the acoustic performances of each of the couples of nodes considered in step 94a, as a function of the first, second and third pieces of information defining each simulated received signal.

For example, as a result of step 94b, we associate an acoustic performance value to each considered couple of nodes, as a function of at least one result of the step of estimating the propagation properties. This acoustic performance value is for example "ok" or "not ok" (i.e. poor acoustic performances) depending on whether the following test is checked or not for the considered couple of nodes: "has the first path (straight line or refracted) a magnitude greater than a threshold?".

FIG. 11 shows a case in which the aforesaid test is checked and FIG. 12 shows a case in which the aforesaid test is not checked. Each of these figures present a sound speed profile (left part of the figure), corresponding ray paths (middle part of the figure) and corresponding channel impulse response (right part of the figure).

Now we present FIG. 11 in more detail. As shown in the left part of FIG. 11, the medium (channel) is a 100 m-depth water column and a sound speed profile with a 50 m depth sound speed minimum and a constant gradient. We assume a thick sand sub-bottom layer. The middle part of FIG. 11 presents the corresponding ray paths, obtained with a ray path tracing method for a 45° aperture launch, a 300 m-distance, and a 10 m depth for the sender node and the receiver node. There are six eigen-ray paths: one direct refracted path (referenced 111a) and five reflected paths (referenced 112a to 116a). The right part of FIG. 11 (channel impulse response) shows the magnitudes (referenced 111b to 115b) of the five first of these paths (magnitudes 111b and 112b are superimposed). Knowing the emitted level (eg. 180 dB ref: 1 µPa @ 1 m, i.e. considering that 1 dB is equivalent to a pressure change of 1 µPa at 1 m of an emitting source), the receiver directivity and sensitivity, it is possible to see if the magnitude (received level) of each path is greater than a specific threshold (also referred to as the system sensitivity), referenced TH in FIG. 11 and supposed equal to 80 dB(A). The aforesaid test is checked in the example of FIG. 11 since the first path (the one referenced 111a) has a magnitude (referenced 111b) greater than the threshold TH.

Now we present FIG. 12 in more detail. As shown in the left part of FIG. 12, the medium (channel) is a 100 m-depth water column and a sound speed profile with a 10 m-depth mixed layer (constant sound speed) and a 50 m depth minimum of sound speed with a constant gradient. We assume a thick sand sub-bottom layer. The middle part of FIG. 12 presents the corresponding eigen-ray paths, obtained with a ray path tracing method for a 30° aperture launch, a 600 m-distance, and a 20 m depth for the sender node and the receiver node. There are five paths, which are all reflected paths (referenced 121a to 125a). The right part of FIG. 12 (channel impulse response) shows the magnitudes (referenced 121b to 124b) of the four first of these paths. Knowing the emitted level (eg. 180 dB ref:1 µPa @ 1 m), the receiver directivity and sensitivity, it is possible to see if the magnitude (received level) of each path is greater than the specific threshold (referenced TH and supposed equal to 80 dB(A)). The aforesaid test is not checked in the example of FIG. 11 since there is no direct path (like direct path 111a in FIG. 11) and the level of the path 121a has not a magnitude (referenced 121b) greater than the threshold TH. Thus, the configuration of FIG. 11 is more optimal than the configuration of FIG. 12 to perform a survey.

Now we continue the description of FIG. 9.

In step 97, we improve the acoustic performances of the nodes network, using the output of step 94b. This can be done before (i.e. in preparation of) the seismic survey (see arrow referenced 95) and/or during the seismic survey (see arrow referenced 96).

More precisely, in the particular embodiment of FIG. 9, the step 97 comprises two step 97a and 97b, each corresponding to one of the two aforesaid situations ("before the survey" for step 97a and "during the survey" for step 97b).

In step 97a (i.e. before the survey), we modify the layout (nodes network geometry), as a function of the results of the step 94b (i.e. as a function of the acoustic performance values associated, in step 94b, to the considered couple of nodes). The step 97a makes it possible to define the optimal position of the nodes (inter-node distances and depths), i.e. the modified layout, in order to optimize the acoustics performances of the nodes network.

For example, in the case of FIG. 12, since the acoustic performance value is "not ok" (i.e. poor acoustic performances) because the aforesaid test is not checked, we can modify the distance between the considered couple of nodes, and/or the depth of one or both nodes.

According to another example, in the case of FIG. 6 (no direct path but only a reflected path) or of FIG. 7 (no path at all) with an inter-node distance of 300 m, we can change this inter-node distance to 150 m. This new value is given for example by FIG. 8 which shows that, with the considered context, the point corresponding to this inter-node distance of 150 m is not in the shadow zone 81. FIG. 10 shows the result of this change of inter-node distance, with a direct refracted path 101 (right part of FIG. 10) between the sender node and the receiver node, both at a 15 m depth.

In step 97b (i.e. during the survey), we adjust one or several parameters of the nodes network (also referred to as degrees of freedom of the nodes network), without modifying the determined layout, as a function of the result of the step 94b (i.e. as a function of the acoustic performance values associated, in step 94b, to the considered couples of nodes).

In particular embodiment, by using continuous measures of the environment properties (in step 92), it is possible to obtain a continuous real time estimation of the acoustics performances of the nodes network, and this continuous estimation can be used to adapt some degrees of freedom of the nodes network.

For example, we can carry out one or several of the following actions, to adapt some degrees of freedom of the nodes network:
- increase the emitted levels of acoustic signals emitted by the acoustic nodes (which has an impact on the energy consumption, on the reliability of the system and on the life duration of the equipments according to Arrhenius law);
- modify the properties of acoustic signals emitted by the acoustic nodes, in order to increase the processing gain, by choosing for instance a signal with a greater time-bandwidth product (which as an impact on the acoustics cycle duration and on the energy consumption);
- modify the nodes excitation strategy in the network, by changing the time or frequency sharing (which as an impact on the acoustics cycle duration);
- modify the way of processing received signals (i.e. modify the signal processing methods implemented by the acoustic nodes to process received acoustic signals): increase the processing gain by using more powerful signal processing tools (as counterpart, the process time will be more important and the acoustics cycle duration as well).

Now referring to FIG. 13, we present the simplified structure of a management device 120 (for managing the acoustic performances of a network of acoustic nodes) according to a particular embodiment.

The management device 130 can be the node manager system or the navigation system. It comprises a read-only memory (ROM) 133, a random access memory (RAM) 131 and a processor 132. The read-only memory 133 (non transitory computer-readable carrier medium) stores executable program code instructions, which they are executed by the processor 132 enable implementation of the technique of the disclosure (e.g. the method of FIG. 9).

Upon initialization, the aforementioned program code instructions are transferred from the read-only memory 133 to the random access memory 131 so as to be executed by the processor 132. The random access memory 131 likewise includes registers for storing the variables and parameters required for this execution. The processor 132 receives the following information (referenced 134a to 134c respectively):
- a sound propagation model;
- environment properties; and
- a determined layout.

According to the program code instructions, the processor 132 delivers:
- a modified layout 135a; and/or
- adjusted parameters 135b of the nodes network (also referred to as adjusted degrees of freedom of the nodes network).

All the steps of the above estimation method can be implemented equally well:
- by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a floppy disk, a CD-ROM or a DVD-ROM) or non-detachable; or
- by a dedicated machine or component, such as an FPGA (Field Programmable Gate Array), an ASIC (Application-Specific Integrated Circuit) or any dedicated hardware component.

An exemplary, non-limiting embodiment of the disclosure provides a technique for managing the acoustic performances of a network of acoustic nodes arranged along towed acoustic linear antennas.

An embodiment provides a technique of this kind that allows to optimize the acoustic performances of a network of acoustic nodes, before and/or during a survey.

An embodiment provides a technique of this kind that is simple to implement and costs little.

Although the present disclosure has been described with reference to one or more examples, workers skilled in the art will recognize that changes may be made in form and detail without departing from the scope of the disclosure and/or the appended claims.

The invention claimed is:

1. A method for improving acoustic performances of a network of acoustic nodes arranged along towed acoustic linear antennas, the network of acoustic nodes being adapted to determine inter-node distances allowing to locate the acoustic linear antennas, wherein the method comprises acts of:
   obtaining a determined layout of the network of acoustic nodes;
   obtaining at least one marine environment property relating to an area of performance of a survey with the network of acoustic nodes;
   quantifying the acoustic performances of the network of acoustic nodes, using a sound propagation model, the at least one marine environment property and the determined layout; and
   improving the acoustic performances of the network of acoustic nodes, as a function of at least one result of the act of quantifying, said act of improving the acoustic performances of the network of acoustic nodes comprising at least one of the following acts:
   modifying the determined layout, as a function of at least one result of the act of qualifying; or adjusting at least one parameter of the network of acoustic nodes, without modifying the determined layout, as a function of at least one result of the act of qualifying.

2. The method according to claim 1, wherein the determined layout is defined at least by determined horizontal distances between the acoustic nodes and a determined immersion depth of each acoustic node.

3. The method according to claim 1, wherein the act of quantifying the acoustic performances comprises, for at least one given couple of nodes comprising a sender node and a receiver node, acts of:
- estimating the propagation properties of an acoustic signal through an underwater acoustic channel between the sender node and the receiver node of the given couple of nodes, using said sound propagation model and knowing:
  - the immersion depths of the sender node and the receiver node,
  - a horizontal distance between the sender node and the receiver node, and
  - the at least one marine environment property, comprising at least an estimate of the sound speed profile of the underwater acoustic channel;
- associating an acoustic performance value to the given couple of nodes, as a function of at least one the result of the act of estimating the propagation properties.

4. The method according to claim 3, wherein the at least one result of the act of estimating the propagation properties belongs to the group comprising:
- a first piece of information relating to a kind of at least one path existing between the sender node and the receiver node of the given couple of nodes;
- a second piece of information relating to a magnitude of at least one path existing between the sender node and the receiver node of the given couple of nodes; and
- a third piece of information relating to a multipath correlation distortion rate.

5. The method according to claim 3, wherein the act of improving the acoustic performances takes into account the acoustic performance value associated to the at least one given couple of nodes.

6. The method according to claim 1, wherein the at least one marine environment property belongs to the group comprising:
- sound speed profiles, depending on depth;
- bathymetric characteristics;
- sub-bottom properties.

7. The method according to claim 1, wherein the act of obtaining at least one marine environment property is carried out using at least one method belonging to the group consisting of:
- methods of consulting at least one database;
- methods of direct measuring, using a measurement device and/or an acoustic method; or
- methods of indirect measuring, using an inversion process.

8. The method according to claim 1, wherein the act of modifying the determined layout is executed before the survey.

9. The method according to claim 1, wherein the at least one parameter of the network of acoustic nodes belongs to the group consisting of:
- emitted levels of acoustic signals emitted by the acoustic nodes;
- properties of acoustic signals emitted by the acoustic nodes;
- time and/or frequency sharing methods implemented by the acoustic nodes, having an impact on acoustic cycle durations; and
- signal processing methods implemented by the acoustic nodes to process received acoustic signals.

10. The method according to claim 1, wherein the act of adjusting at least one parameter of the network of acoustic nodes is executed during the survey.

11. A non-transitory computer-readable carrier medium storing a program which, when executed by a computer or a processor, causes the computer or the processor to carry out a method for improving acoustic performances of a network of acoustic nodes arranged along towed acoustic linear antennas, the network of acoustic nodes being adapted to determine inter-node distances allowing to locate the acoustic linear antennas, the method comprising acts of:
- obtaining a determined layout of the network of acoustic nodes;
- obtaining at least one marine environment property relating to an area of performance of a survey with the network of acoustic nodes;
- quantifying with the computer or the processor the acoustic performances of the network of acoustic nodes, using a sound propagation model, the at least one marine environment property and the determined layout; and
- improving the acoustic performances of the network of acoustic nodes, as a function of at least one result of the act quantifying, said act of improving the acoustic performances of the network of acoustic nodes comprising at least one of the following acts:
  - modifying the determined layout, as a function of at least one result of the act of quantifying; or
  - adjusting at least one parameter of the network of acoustic nodes, without modifying the determined layout, as a function of at least one result of the act of quantifying.

12. A device for improving acoustic performances of a network of acoustic nodes arranged along towed acoustic linear antennas, the network of acoustic nodes being adapted to determine inter-node distances allowing to locate the acoustic linear antennas, wherein the device comprises:
- means for obtaining a determined layout of the network of acoustic nodes;
- means for obtaining at least one marine environment property relating to an area of performance of a survey with the network of acoustic nodes; and
- means for quantifying the acoustic performances of the network of acoustic nodes, using a sound propagation model, the at least one marine environment property and the determined layout; and
- means for improving the acoustic performances of the network of acoustic nodes, as a function of at least one result of the act of quantifying, said means for improving the acoustic performances of the network of acoustic nodes comprising at least one of the following means:
  - means for modifying the determined layout, as a function of at least one result of the act of quantifying; or
  - means for adjusting at least one parameter of the network of acoustic nodes, without modifying the determined layout, as a function of at least one result of the act of quantifying.

* * * * *